US011380216B1

(12) United States Patent
Balan et al.

(10) Patent No.: US 11,380,216 B1
(45) Date of Patent: Jul. 5, 2022

(54) DYNAMIC NUMBER BOARD GAME FOR ADAPTIVE LEARNING

(71) Applicant: Knomadix Corporation, Frisco, TX (US)

(72) Inventors: Ramesh Balan, Frisco, TX (US); Divya Balasubramanian, Chicago, IL (US)

(73) Assignee: Knomadix Corporation, Frisco, TX (US)

( * ) Notice: Subject to any disclaimer, the term of this patent is extended or adjusted under 35 U.S.C. 154(b) by 725 days.

(21) Appl. No.: 16/157,552

(22) Filed: Oct. 11, 2018

(51) Int. Cl.
*G09B 19/02* (2006.01)

(52) U.S. Cl.
CPC .................. *G09B 19/025* (2013.01)

(58) Field of Classification Search
CPC ..................................... G09B 19/025
USPC ........................................ 434/128
See application file for complete search history.

(56) References Cited

U.S. PATENT DOCUMENTS

| | | | |
|---|---|---|---|
| 4,979,749 A | 12/1990 | Onanian | |
| 5,678,001 A * | 10/1997 | Nagel | A63F 3/022 273/237 |
| 5,688,126 A | 11/1997 | Merritt | |
| 6,089,871 A | 7/2000 | Jaffe | |
| 6,648,648 B1 | 11/2003 | O'Connell | |
| 7,303,398 B2 * | 12/2007 | Soto | A63F 3/00138 273/279 |
| 2010/0221686 A1 * | 9/2010 | Johnson | A63F 3/00006 434/129 |

* cited by examiner

*Primary Examiner* — Kesha Frisby
(74) *Attorney, Agent, or Firm* — DLA Piper LLP (US)

(57) ABSTRACT

Provided, in an aspect, is a dynamic number board game. A method for generation of the dynamic number board game can include, receiving one or more input data associated with generation of the dynamic number board game; generating one or more timers in accordance with the received input data; determining one or more fluency metrics in accordance with the received input data; generating a primitive number board game based on the received input data; generating one or more problems for the primitive board game based on the received input data; dynamically generating one or more hints for each of the generated problems; and presenting for display, the dynamic number board game based on the primitive number board game, the one or more timers, the one or more fluency metrics, and the dynamically generated one or more hints.

20 Claims, 12 Drawing Sheets

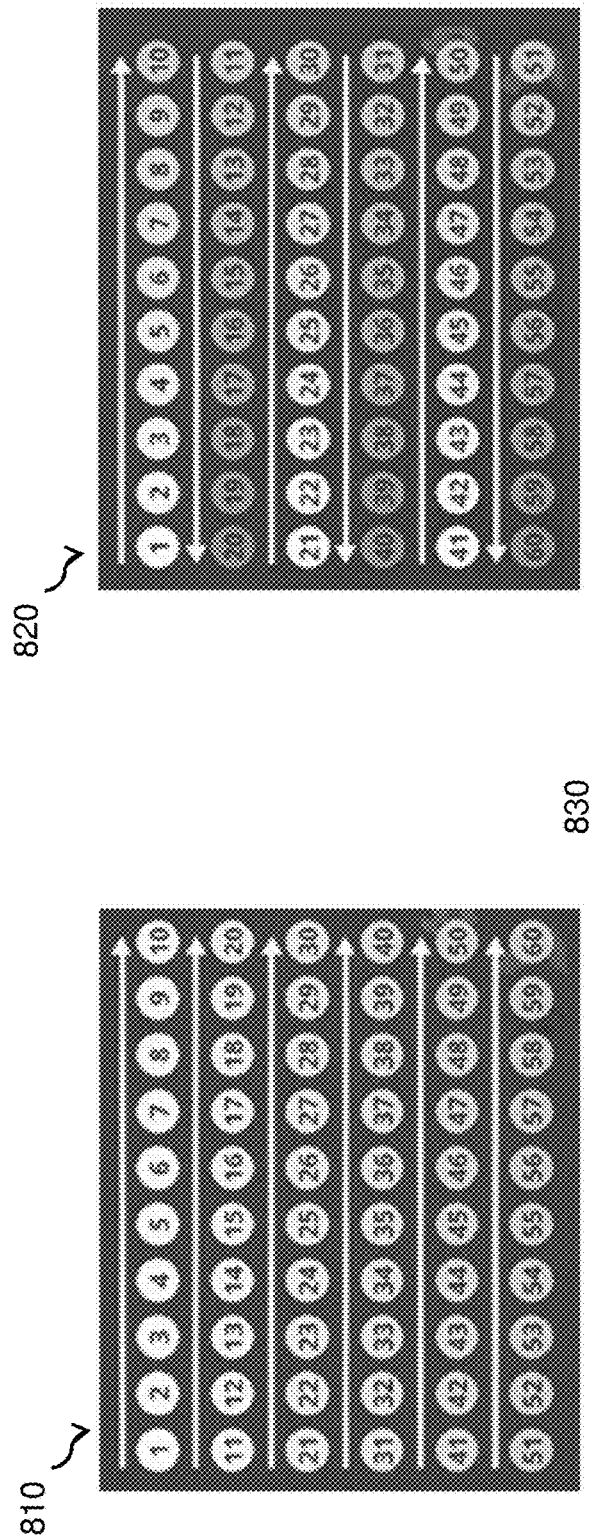
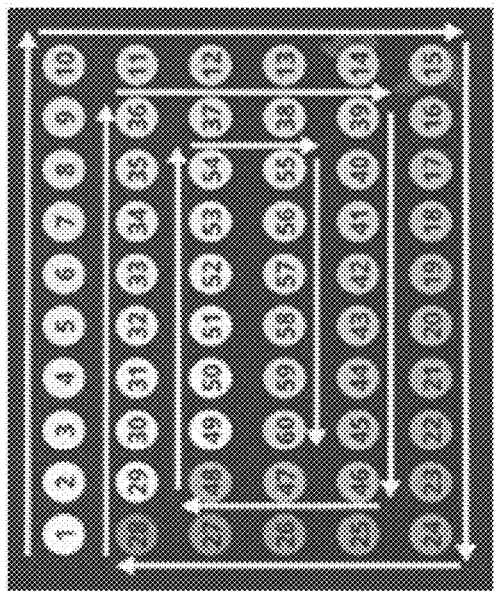
FIG. 8A
FIG. 8B
FIG. 8C

DYNAMIC NUMBER BOARD GAME FOR ADAPTIVE LEARNING

BACKGROUND

Math achievement is alarmingly low in K-6 schools. Many students are not given sufficient opportunities to develop their number sense skills (e.g. understanding quantities, recognizing relations between groups of items, making number comparisons, decomposing numbers, and understanding spatial relationships between numbers) using sound foundational math principles. Without number sense skills, such students are not academically prepared to advance to solve more complex mathematical concepts.

Physical number board games, such as those described in U.S. Pat. Nos. 5,688,126, 6,648,648, and 6,089,871, with representation of linear numbers can improve students' performance in the areas of counting, number identification, and numerical magnitude comparison. While such physical number boards provide students the opportunity to visualize numbers spatially, one of the biggest problems with a physical board game is its rigidity and static nature of the instrument itself.

Educators and parents know that many students use their fingers to do simple math. Conventional learning methodologies such as the physical number boards widely used now do not allow students to do math mentally using proven mathematical concepts, strategies, and techniques. Accordingly, many children are unable to build a strong math foundation at a very early age and are also unable to develop confidence with math learning.

SUMMARY

In an aspect of the present disclosure, a method for generation of a dynamic number board game includes, receiving, by a client device, one or more input data associated with generation of the dynamic number board game; generating, by the client device, one or more timers in accordance with the received input data; determining one or more fluency metrics in accordance with the received input data; generating a primitive number board game based on the received input data; generating one or more problems for the primitive board game based on the received input data; dynamically generating, by the client device, one or more hints for each of the generated problems; and presenting for display, the dynamic number board game based on the primitive number board game, the one or more timers, the one or more fluency metrics, and the dynamically generated one or more hints.

In some embodiments, the method can include dynamically measuring, by the client device, one or more scores of one or more users based on a level of interaction of each user with the dynamic number board game. In some embodiments, the method can include performing, by the client device, an evaluation of one or more levels of interaction of each user of the dynamic number board game; generating, by the client device, a report comprising the evaluated performance of each user; and presenting for display, through a user interface of the client device, the generated report.

In some embodiments, dynamically generating one or more hints for each of the generated problems is based on a type of the problem, a user history, and one or more principles of math learning. In some embodiments, the received input data includes at least one of: a number sense concept, a type of skill, a number of tiles in the dynamic number board game, a starting value of a tile in the dynamic number board game, a type of ordering of tiles in the dynamic number board game, a type of layout of tiles in the dynamic number board, one or more display settings in the dynamic number board game, and one or more user historical information. In some embodiments, dynamically generating one or more hints for each of the generated problems can include identifying one or more patterns in user interaction with each of the generated problems; and performing a decomposition of the generated problem into a plurality of solvable elements, wherein the client device modifies each of the plurality of solvable elements to achieve a final answer for the generated problem. In some embodiments, generating one or more timers in accordance with the received input data is based on one or more machine learning models. In some embodiments, a user of the client device provides the one or more input data based on an interaction of the user with a display of the dynamic number board game. In some embodiments, the client device determines the one or more input data associated with generation of the dynamic number board game by performing the steps of: determining a threshold value of complexity of one or more problems presented to a player of the dynamic number board game; and determining a readiness of the player to be presented with the threshold value of complexity of problems based on the one or more determined fluency metrics.

In some embodiments, presenting for display the dynamic number board game further includes: presenting for display, each of the plurality of positive whole numbers responsive to a user of the client device interacting with a practice mode button of the dynamic number board game; and presenting for display, a portion of the plurality of positive whole numbers if the user of the client device interacts with a play mode button of the dynamic number board game.

Another aspect of the disclosure relates to a method for generation of a dynamic number board game. The method includes, retrieving, by a server, one or more input data associated with generation of the dynamic number board game; generating, by the server, one or more timers in accordance with the received input data; determining one or more fluency metrics in accordance with the received input data; generating a primitive number board game based on the received input data; generating one or more problems for the primitive board game based on the received input data; dynamically generating, by the server, one or more hints for each of the generated problems; and presenting for display, the dynamic number board game based on the primitive number board game, the one or more timers, the one or more fluency metrics, and the dynamically generated one or more hints. In some embodiments, the server can dynamically measure one or more scores of one or more users based on a level of interaction of each user with the dynamic number board game. In some embodiments, the server can perform an evaluation of one or more levels of interaction of each user of the dynamic number board game; generate, by the server, a report comprising the evaluated performance of each user; and present for display, through a user interface of the client device in communication with the server, the generated report. In some embodiments, the server can dynamically generate one or more hints for each of the generated problems based on a type of the problem, a user history, and one or more principles of math learning.

In some embodiments, the received input data includes at least one of: a number sense concept, a type of skill, total number of tiles in the dynamic number board game, the starting value of first tile in the dynamic number board game, a type of ordering of tiles in the dynamic number board game, a type of layout of tiles in the dynamic number board game, one or more display settings in the dynamic number board game, and one or more user historical information. In some embodiments, the server can dynamically generate one or more hints for each of the generated problems by identifying one or more patterns in user interaction with each of the generated problems; and performing a decomposition of the generated problem into a plurality of solvable elements, wherein the server modifies each of the plurality of solvable elements to achieve a final answer for the generated problem. In some embodiments, the processor can generate one or more timers in accordance with the received input data based on one or more machine learning models. In some embodiments, the server retrieves the one or more input data associated with generation of the dynamic number board game by performing the steps of: determining a threshold value of complexity of one or more problems presented to a player of the dynamic number board game; and determining a readiness of the player to be presented with the threshold value of complexity of problems based on the one or more determined fluency metrics. In some embodiments, the processor can present for display the dynamic number board game by presenting for display, each of the plurality of positive whole numbers responsive to a user of the client device interacting with a practice mode button of the dynamic number board game; and presenting for display, a portion of the plurality of positive whole numbers if the user of the client device interacts with a play mode button of the dynamic number board game.

Another aspect of the disclosure relates to an apparatus for electronically generating a number board. The apparatus can include an input data store, a board generator, a problem engine, a hint engine, a dynamic timer, a dynamic scorer, and a fluency evaluator. The input data store can store one or more input data received from a user of the apparatus. The board generator can generate a primitive number board game based on the received input data and present for display a dynamic number board game generated from the primitive number board game. The problem engine can generate one or more problems for the primitive board game based on the one or more input data. The hint engine can dynamically generate one or more hints for each of the problems generated by the problem engine by performing the steps of: identifying one or more patterns in user interaction with each of the generated problems; and performing a decomposition of the generated problem into a plurality of solvable elements, wherein the hint engine modifies each of the plurality of solvable elements to achieve a final answer for each of the generated problems. The dynamic timer can generate one or more timers in accordance with the received input data. The dynamic scorer can dynamically measure one or more scores of one or more users of the apparatus based on a level of interaction of each user with the dynamic board game. The fluency evaluator can determine one or more fluency metrics in accordance with the received input data. The adaptive engine can determine a threshold value of complexity of one or more problems presented to a player of the dynamic number board game; and determine a readiness of the player to be presented with the threshold value of complexity of problems based on the one or more fluency metrics determined by the fluency evaluator.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

FIGS. 8A-C is an illustrative example of a user interface of the client device of FIG. 2 with a dynamically generated virtual number board game, according to some embodiments of the present disclosure.

Figure 1:
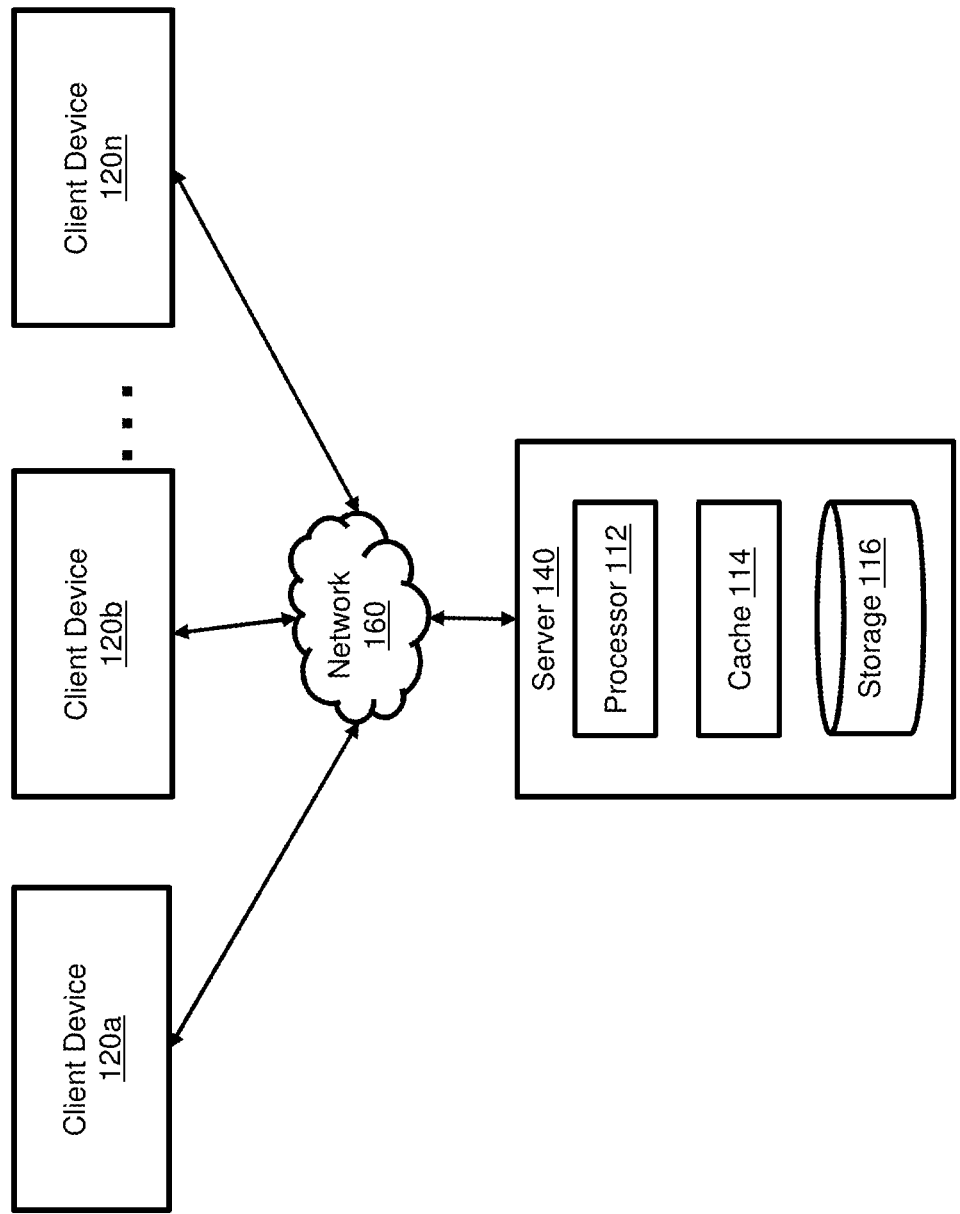
FIG. 1 is a block diagram of a system environment for dynamically generating a virtual number board game, according to some embodiments of the present disclosure.

The drawings are not necessarily to scale, or inclusive of all elements of a system, emphasis instead generally being placed upon illustrating the concepts, structures, and techniques sought to be protected herein.

DETAILED DESCRIPTION

During the process of digitizing a physical number board, the method disclosed herein transforms a traditional number board from a static learning instrument to a dynamic learning instrument. The dynamic number board game (also referred to as virtual number board game) can be embedded as part of a software application running on a client device, which is delivered as a foundational math enrichment solution that can allow players of the dynamic number board game to master numerical concepts and number operations. The dynamic number board game can provide a visual interface for students to input answers to problems presented to the player in various mathematical concepts—instead of using the keyboard to type in the answer responses. It is important to note that the method disclosed herein pertains to only generating problems that result in answers that are positive, integer numbers. Making the number board dynamic can control the complexity of the game that is delivered to the player, and can also make the game more challenging or less challenging automatically depending on the skill level and mastery of a student over a concept or a skill. The main objective of making the number board dynamic is to create a basis for an adaptive math learning game, and also, to get players to employ visual thinking and spatial temporal reasoning skills. Such functionality can in turn allow the users to develop not only mathematical skills, but also critical thinking and cognitive skills.

Creating dynamic learning opportunities for students can help the students learn more effectively because of at least one of: 1) interactivity, which leads to better engagement, 2) instant feedback, which leads to better learning, 3) real time data gathering, which leads to making the system more adaptive and personalized to suit the needs of the student, and 4) applying machine learning and artificial intelligence to provide better assistance to the students to accelerate a pace of learning.

Disclosed in the present disclosure, in one aspect, is a dynamic number board game. A method for generation of the dynamic number board game can include, receiving one or more input data associated with generation of the dynamic number board game; generating one or more timers in accordance with the received input data; determining one or more fluency metrics in accordance with the received input data; generating a primitive number board game based on the received input data; generating one or more problems for the primitive board game based on the received input data; dynamically generating one or more hints for each of the generated problems; and presenting for display, the dynamic number board game based on the primitive number board game, the one or more timers, the one or more fluency metrics, and the dynamically generated one or more hints.

Another aspect of the present disclosure could involve, a turn-based game where the same dynamic number board game can be used to generate a certain game at a certain complexity level, which can be the core of the competition that is dynamically set up in a turn-based game setting that involves two or more players who are working together to complete a single game—while at the same time competing against each other based on speed and accuracy.

Another aspect of the present disclosure could involve a synchronous game played by two or more players in a competitive setting, all playing to solve the problems on a single number board, separately but simultaneously. The scoreboard for the competition could present the results in real time with dynamic indicators that show the status and scores for each player.

A fourth aspect of a present disclosure could involve presenting a game that is played by two or more players in a competitive setting, all playing to solve the problems on a single number board, separately but asynchronously. The scoreboard for the competition could present results in real time with dynamic indicators that show the status and scores for each player.

Applications

The field in which the development of the disclosed apparatus is primarily applicable would be the K-6 Math education. In one aspect, the disclosed apparatus can be used by older players to reinvigorate their understanding of numbers and their ability to quickly manipulate complex numerical operations. In another aspect, the disclosed apparatus has broad applicability in various contexts both inside and outside classrooms including: a supplemental resource within K-12 schools, a remedial resource for students who are struggling with math, a resource for students to have more fun with math learning, a resource for students with different learning preferences—for e.g., visual, auditory or tactile learning modes, ability to challenge the gifted and talented children by using the various orientations of the number board to further enhance their math skills and whole brain thinking skills, a supplemental education resource at home, internet-based multi-player games that are competitive, and focused on challenging players while having fun and developing their number sense skills using multiple game formats including a turn-based game, a synchronous number board game played by multiple players at the same time, an asynchronous number board game played by multiple players at their own time, and a foundational math skill training resource to players of all ages.

System Architecture

FIG. 1 is a block diagram of a system environment 100 for dynamically generating a virtual number board game, according to some embodiments of the present disclosure. The system environment 100 shown by FIG. 1 can include one or more client devices 120, a server 140, and a network 160. As shown in FIG. 1, the server 140 can include a processor 112, a cache 114, and a storage 116. The processor 112 can be a hardware component that can execute one or more programmable instructions loaded into a storage 116. The cache 114 can be implemented using high-speed memory devices that provide fast access to the cached data. In alternative configurations, different and/or additional components may be included in the system environment 100. In some embodiments, the system environment 100 can include a single client device 120 operating in an offline mode without making any communication through the network 160.

Each of the client devices 120 can include a computing device, such as a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and/or any other type of computing device that may be configured to store data and software instructions, execute software instructions to perform operations, and/or display information on a display device.

As described below in conjunction with FIG. 2A, each of the client devices 120 can include one or more tangible, non-transitory memories that store data and/or software instructions, and one or more processors configured to execute software instructions. The client device 120 may include one or more display devices that display information to a user and one or more input devices (e.g., keypad, keyboard, touchscreen, voice activated control technologies, or any other type of known input device) to allow the user to input information to the client device. In one aspect, each of the client devices 120 can store in memory one or more software applications that run on the client device and are executed by the one or more processors. In some instances, each client device can store software applications that, when executed by one or more processors, perform operations that establish communications with a server. Each of the client devices 120 may execute the stored software application(s) to generate a dynamic number board game. The executed software applications may cause the client devices 120 to display a dynamically generated virtual number board game through a user interface of the client devices 120.

Each of the one or more client devices 120, and the server 140, can communicate via the network 160, which may include any combination of local area and/or wide area networks, using both wired and/or wireless communication systems. In one embodiment, the network 160 uses standard communications technologies and/or protocols. For example, the network 160 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 160 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 160 may be represented using any suitable format, such as hypertext markup language (HTML) or extensible markup language (XML). In some embodiments, all or some of the communication links of the network 160 may be encrypted using any suitable technique or techniques.

In the depicted example of FIG. 1, the network 160 is the Internet with the network 160 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the network 160 also may be implemented as a number of different types of networks, such as for example, an intranet, a local area network (LAN), or a wide area network (WAN). Also, it should be noted that the network 160 may include any number of additional server devices, client devices, and other devices not shown. Program code located in the network 160 may be stored on a computer recordable storage medium and downloaded to a computer or other device for use. For example, program code may be stored on a computer recordable storage medium on the server 140 and downloaded to the client device 120a over the network 160 for use on the client device 120a. FIG. 1 is intended as an example, and not as an architectural limitation for the different illustrative embodiments.

The server 140 can include one or more computing devices that can execute software instructions to perform processing in accordance with various embodiments. As shown in FIG. 1, the server 140 can include a computer (e.g., a personal computer, network computer, or mainframe computer) having the processor 112, the cache 114, and the storage 116. In one example, the server 140 is a computing device that can execute software instructions to perform operations that provide information to at least one other component of the system 100. For example, the server 240 can store historical information of one or more user's achievements on a virtual number board game generated by the client device 120. In some configurations, a user of a first client device 120a can communicate with a second client device 120b by communicating with the server 140. In one example, the user of the first client device 120a can send a request to the server 140 to enable communication with the second client device 120b (e.g. to send a friend request). The second client device 120b can receive the request from the server 140, and accept the friend request from the first client device 120a.

Figure 2A:
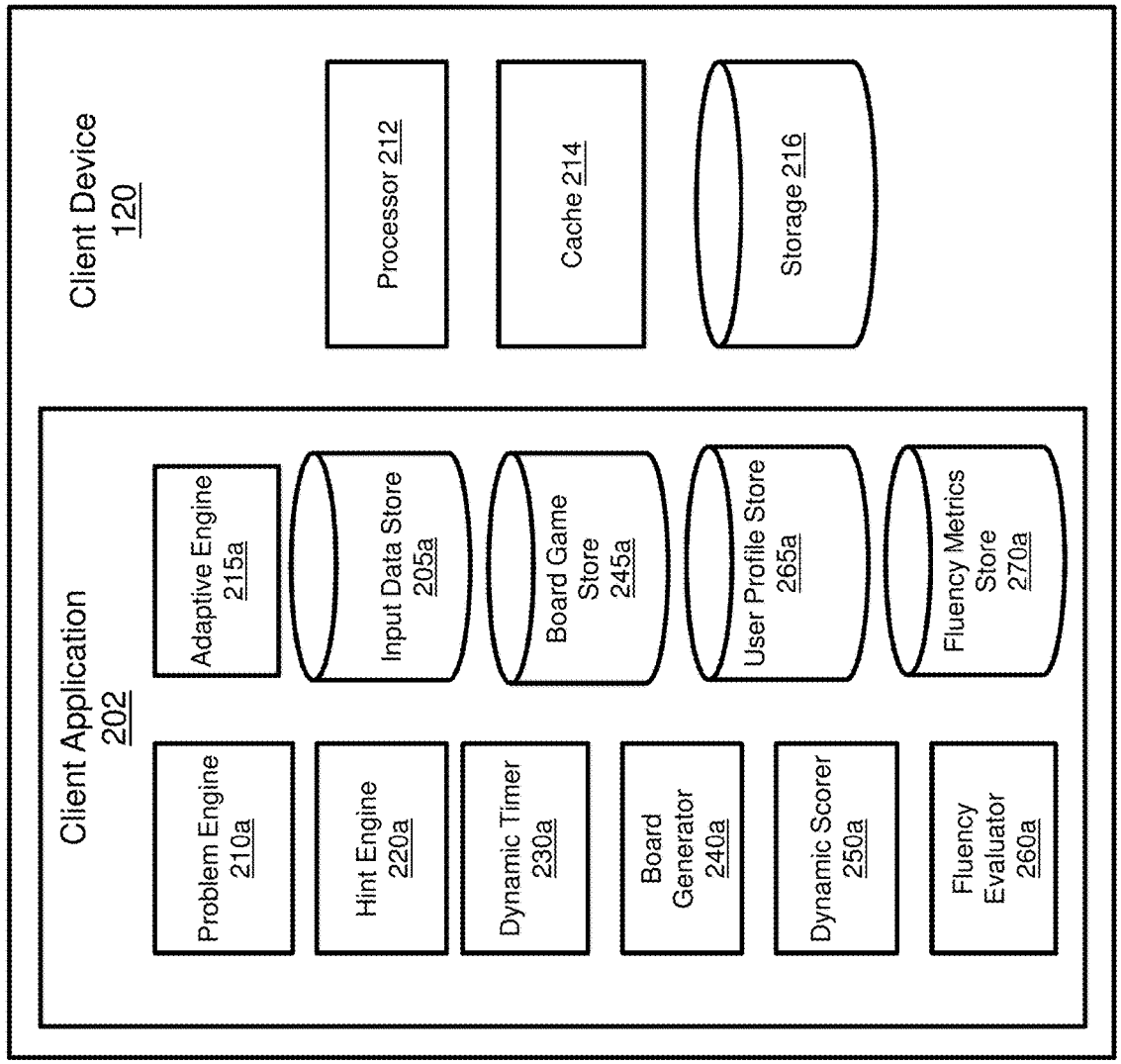
FIG. 2A is a block diagram of a client device in the system environment of FIG. 1, according to some embodiments of the present disclosure.

FIG. 2A is a block diagram of a client device 120 in the system environment of FIG. 1, according to some embodiments of the present disclosure. As shown in FIG. 2A, the client device 120 can include a client application 202, a processor 212, a cache 214, and a storage 216. In alternative configurations, different and/or additional components may be included in the client device 120. The client application 202 can include an input data store 205a, a problem engine 210a, an adaptive engine 215a, a hint engine 220a, a dynamic timer 230a, a board generator 240a, a board game store 245a, a dynamic scorer 250a, a fluency evaluator 260a, a user profile store 265a, and a fluency metrics store 270a. The client application 202 can be a software application running on the client device 120 and executed by the processor 212 which is a hardware component that can execute one or more programmable instructions loaded into a storage 216. The cache 214 can be implemented using high-speed memory devices that provide fast access to the cached data.

The input data store 205a can store one or more input data received from a user of a dynamic virtual number board game. The received input data can include: a number sense concept (e.g. numbers, addition, subtraction, multiplication, division, mixed operations, roman numerals, simple equations, mashup, ratios and proportions, fractions, decimals, base (2, 3, 4, 5, 6, 7, 8, 9, and 16) arithmetic, and word-based problems, etc.), a type of skill (beginner, advanced, and sensei), a number of tiles in the dynamic number board game (e.g. 10 to 20), a starting value (e.g. 1 to 11) of the first tile in the dynamic number board game, a type of ordering (e.g. Right then Down, Down then Right, Left then Up, Up then Left, Right then Up, Up then right, Left then Down and Down then Left, etc.) of tiles in the dynamic number board game, a type of layout (e.g. Basic, Zigzag, Spiral) of tiles in the dynamic number board game, one or more display settings (e.g. Show/Hide numbers) in the dynamic number board game, and one or more user historical information. In some configurations, a user of the client device 120 can provide the input data directly to the input data store 205a by performing an interaction with a user interface of the client device 120 that displays the dynamic number board game.

The problem engine 210a can generate one or more problems for a virtual number board game based on the data stored in the input data store 205a. For example, the problem engine 210a can generate a problem involving addition of two positive whole numbers such as 10 and 14. In some configurations, the problem engine 210a can generate problems for the virtual number board game based on a current input data stored in the input data store 205a. The current data input data can indicate a starting value of a tile and/or number of tiles in the virtual number board game received as an input from a user through the user interface of the client device 120.

The adaptive engine 215a can determine a threshold value of complexity of problems presented to a player of the dynamic number board game. For example, the adaptive engine 215a can determine that a current problem generated by the problem engine 210a may be problems involving addition with carry over while the player may have never performed additions with carry over. The adaptive engine 215a can also determine a readiness of the player to be presented with the threshold value of complexity of problems based on the fluency metrics determined by the fluency evaluator 260a.

The hint engine 220a can dynamically generate one or more hints for each of the problems generated by the problem engine 210. The hint engine 220a can dynamically generate one or more hints for each of the problems generated based on a type of the problem, a user history, and one or more principles of math learning. In some configurations, as described below in detail with reference to FIG. 9, the hint engine 220a can communicate with the board generator 240a to display a number of dynamically generated hints for an answer to the generated problem in the form of a lightbulb. The number overlaid on the displayed lightbulb can indicate a remaining number of hints dynamically generated by the hint engine 220a.

In some embodiments, the hint engine 220a can dynamically generate one or more hints for each of the generated problems by using an expert system. As described herein, the expert system is a computer system that emulates the decision-making ability of a human expert (e.g. a math teacher, a parent, etc.). The expert system may be divided into two subsystems: an inference engine and a knowledge base. The knowledge base can represent facts and rules. The inference engine can apply the rules to the known facts to deduce new facts. The inference engine can also include explanation and debugging abilities. The expert system can identify one or more patterns in user interaction with each of the generated problems and perform a decomposition of the generated problem based on generating one or more random numbers. In one example, the expert system (driven by artificial intelligence) can detect that the user is having trouble with solving a problem based on the current fluency metrics of a user. The expert system can perform a decomposition of the original problem into solvable elements. The expert system can perform reassembly of the solvable elements to come up with a final answer. The expert system can basically walk the user through a step-by-step process to correctly approach and solve the problem. For example, in the case of an addition problem "24+52", the expert system can decompose the problem to "(20+4)+(50+2)" as the first step to solve the problem, and then, as a second step, reassembles the solvable elements to "(20+50)+(4+2)" and the final step to be "70+6", which will lead to the answer, which is 76. A second variant for this addition example would be when the problem is "18+29", the system generates "(10+8)+(30−1)" as the intermediate step, and then "(10+30)+(8−1)" as the second step, and "40+7" as the final step, resulting in the final answer, which is 47. Note that the expert system has a built-in rule-based engine that will detect the patterns in the problem and generates the steps accordingly. The rules that are part of the expert system can vary based on the type of the problems. In some configurations, the expert system can use foundational math theory and concepts to optimally solve the problem. This allows for the student to not only improve the number sense skills by playing the game, but also learn the right approaches to mentally decompose and reassemble the problem using foundational math principles. Accordingly, the student can optimally solve the problem and thereby achieve mastery over foundational math concepts.

The dynamic timer 230a can generate one or more timers in accordance with the received input data. In some embodiments, the dynamic timer 230a can generate the one or more timers based on one or more machine learning models. For example, the dynamic timer 230a can use machine learning—that is, data gathering and analytics based on the gathered data—to make judgements upon the baseline values for the dynamic timer 230a in accordance with the user's historical information stored in the server 140 and also in accordance with the determined difficulty of the set of problems generated by the problem engine 210a relative to other problems. In another embodiment, the dynamic timer 230a could make adjustments to the baseline values based on groups of user data with similar levels of mastery and fluency. The dynamic timer 230a could also determine baseline values by correlating data based on user's mastery over one concept vs another, and have specific sets of data mined for each mathematical concept. For example, if a user is having trouble solving multiplication problems, it's likely that they will have trouble solving division problems, and thereby the dynamic timer 230a will have to adjust the baseline for division problems. The dynamic timer 230a can determine a countdown process for the generated timer with a dynamically changing color depending on a level of interaction of the user with the dynamic number board game. As described below in conjunction with FIG. 9, the dynamic timer 230a can generate a timer showing how much time is left to solve a problem displayed to the user. The dynamic timer 230a can determine a baseline for the timer and a time duration within which the timer can modify the color of the timer in accordance with the user's historical information of interaction with the dynamic number board game.

The board generator 240a can generate a primitive number board game based on the input data stored in the input data store 205a. The board generator 240a can also present for display a dynamic number board game generated from the primitive number board game. The board game store 245a can be a repository of the dynamic number board games generated by the board generator 240a. The dynamic number board game can include positive whole numbers in the range of 1 to 200. In some configurations, the dynamic number board game can include a plurality of positive even numbers and/or a plurality of positive odd numbers. In alternate configurations, the dynamic number board game can include one or more types of base arithmetic (e.g. base of 2, base of 10, etc.).

The dynamic scorer 250a can dynamically measure one or more scores of users of the dynamic number board game generated by the board generator 240a based on a level of interaction of each user with the dynamic number board game. As described below in conjunction with FIG. 10, the dynamic scorer 250a can display the dynamically measured final score of a user. In some configurations, the dynamic scorer 250a can compare the measured scores of a plurality of users of the dynamic number board game and rank the plurality of users based on the comparison.

The fluency evaluator 260a can determine one or more fluency metrics in accordance with the input data stored in the input data store 205a. In some embodiments, the fluency evaluator 260a can perform an evaluation of one or more levels of interaction of each user of the dynamic number board game generated by the board generator 240a. The fluency evaluator 260a can generate a report including the evaluated performance of each user; and present the generated report to the board generator 240a. In one example, the fluency evaluator 260a can determine a fluency metric with a value of 'consistent performer' which indicate that the user has interacted with the dynamic number board game for a threshold number of times (e.g. five times in a day). In another example, the fluency evaluator 260a can determine a fluency metric with a value of 'accurate performer' which indicate that the user has correctly solved a specific type of problems (e.g. simple equations) generated by the dynamic number board game for a threshold number of times (e.g. twenty-five times within the past seven days). The fluency metrics store 270a is a repository of fluency metrics determined by the fluency evaluator 260a.

The user profile store 265a can store one or achievements of a user within the dynamic number board game (e.g. a type of virtual badges/medals won by the user), a list of users that are in connection with the user through the dynamic number board game, one or more user activity information within the dynamic number board game (e.g. time played, number of problems solved, number of games completed, number of levels mastered, etc.), a list of highest scores achieved by one or more users within the dynamic number board game, etc.

Figure 2B:
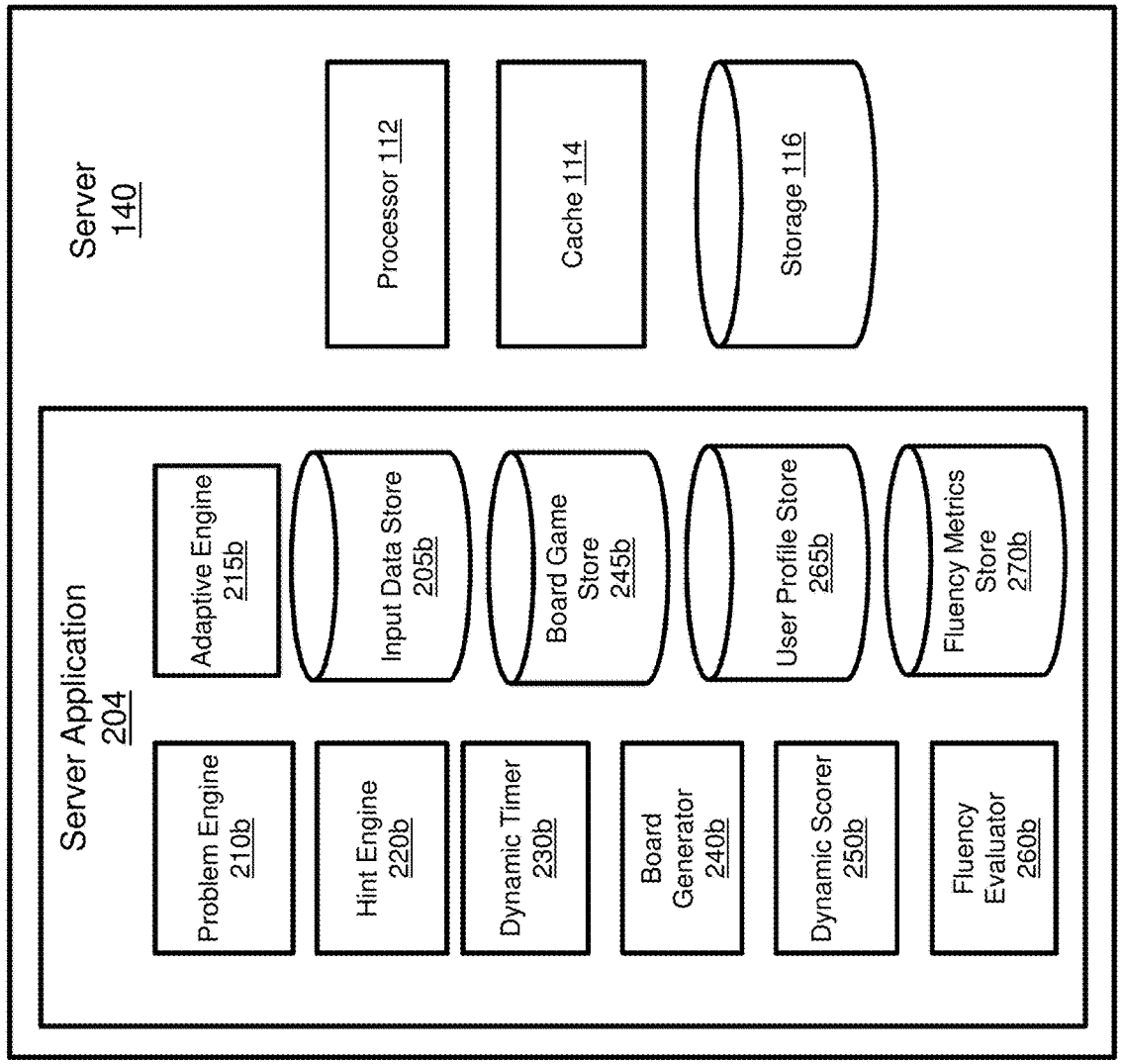
FIG. 2B is a block diagram of a server in the system environment of FIG. 1, according to some embodiments of the present disclosure.

FIG. 2B is a block diagram of the server 140 in the system environment 100 of FIG. 1, according to some embodiments of the present disclosure. As shown in FIG. 2B, the server 140 can include a server application 204, the processor 112, the cache 114, and the storage 116. In alternative configurations, different and/or additional components may be included in the server 140. The server application 204 can include an input data store 205b, a problem engine 210b, an adaptive engine 215b, a hint engine 220b, a dynamic timer 230b, a board generator 240b, a board game store 245b, a dynamic scorer 250b, a fluency evaluator 260b, a user profile store 265b, and a fluency metrics store 270b. The server application 204 can be a software application running on the server 140 and executed by the processor 112 which is a hardware component that can execute one or more programmable instructions loaded into a storage 116. The cache 114 can be implemented using high-speed memory devices that provide fast access to the cached data.

Figure 3:
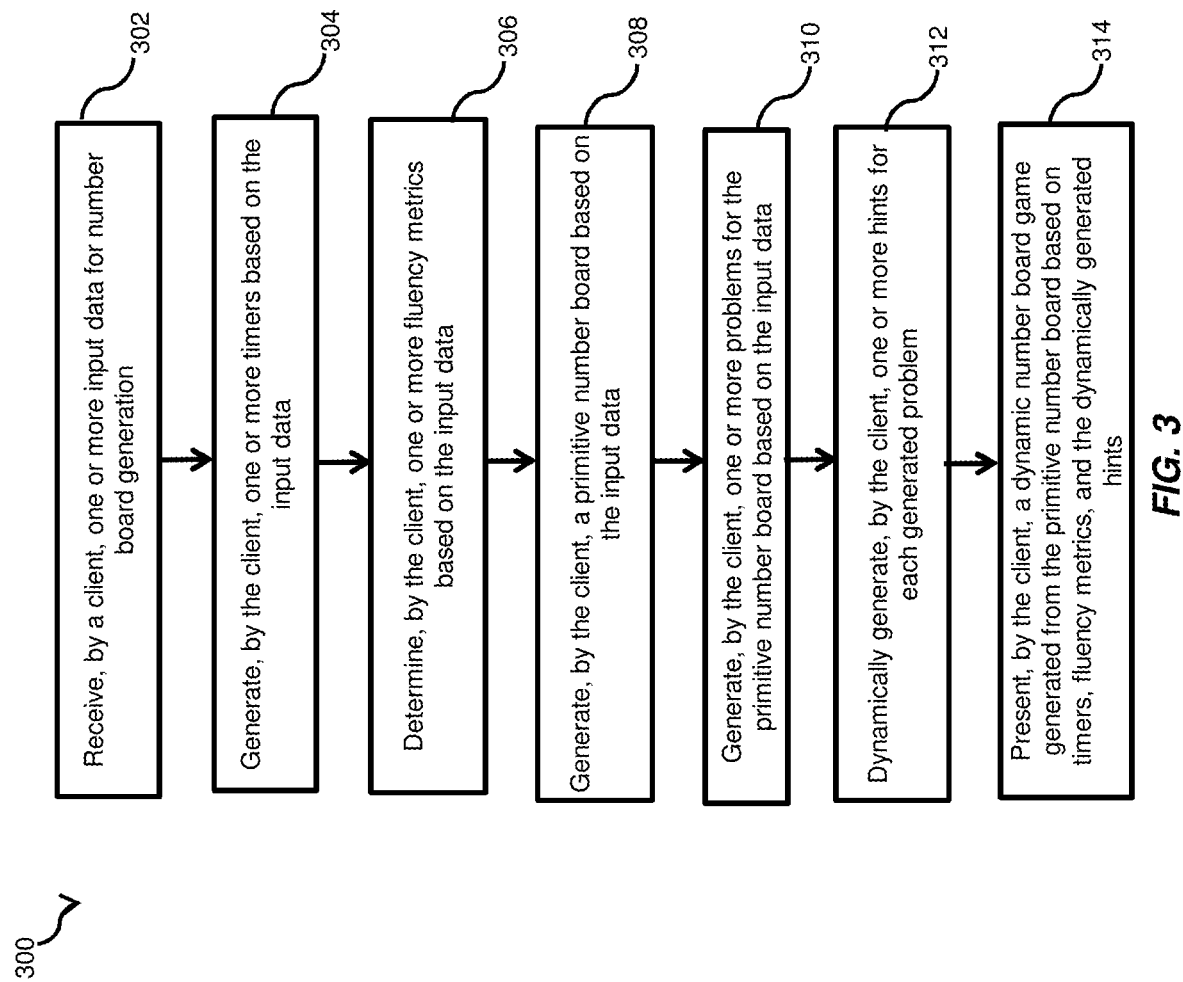
FIG. 3 is a flow diagram showing processing that may occur within the system 100 of FIG. 1, according to some embodiments of the present disclosure.

FIG. 3 is a flow diagram 300 showing processing that may occur within the client device 120 of FIG. 1, according to some embodiments of the present disclosure. The flow diagram 300 of FIG. 3 may be performed by the system 100. Other entities may perform some or all of the steps of the process in other embodiments. Likewise, embodiments may include different and/or additional steps, or perform the steps in different orders.

The client device 120 can receive 302 one or more input data for generating a dynamic number board. For example, the client device 120 can receive the input data from a user of the dynamic number board game through an user interface of the client device 120. The client device 120 can store the received input data in the input data store 205. In alternate embodiments, the server 140 can receive one or more input data for generating a dynamic number board.

The client device 120 can generate 304 one or more timers based on the input data. In some configurations, the client device 120 can generate the one or more timers by applying one or more machine learning models on the input data. In alternate embodiments, the server 140 can generate one or more timers based on the input data.

The client device 120 can determine 306 one or more fluency metrics based on the input data. In some embodiments, the client device 120 can perform an evaluation of one or more levels of interaction of each user of the dynamic number board game, and generate a report including the evaluated performance of each user. In alternate embodiments, the server 140 can determine one or more fluency metrics based on the input data.

The client device 120 can generate 308 a primitive number board based on the input data. For example, the client device can generate the primitive number board with a default number of tiles and a starting value of the tiles. The primitive number board may be based on one or more mathematical concepts. In alternate embodiments, the server 140 can generate a primitive number board based on the input data.

The client device 120 can generate 310 one or more problems for the primitive number board based on the input data. For example, the client device 120 can generate a problem related to addition (e.g. 18+4) when the input data indicates the mathematical concept as addition or sum of two numbers. In alternate embodiments, the server 140 can generate one or more problems for the primitive number board based on the input data.

The client device 120 can dynamically generate 312 one or more hints for each generated problem. For example, in the case of an addition problem "24+52", the client device 120 can decompose the problem to "(20+4)+(50+2)" as the first step to solve the problem, and then, as a second step, reassembles the solvable elements to "(20+50)+(4+2)" and as the final step to display as "70+6", which will lead to the answer, which is 76.

In alternate embodiments, the server 140 can dynamically generate one or more hints for each generated problem. For example, when the problem is "18+29", the server 140 can generate "(10+8)+(30−1)" as the first step, and then "(10+30)+(8−1)" as the second step, and "40+7" as the final step, yielding to the answer 47.

The client device 120 can present 314 a dynamic number board game generated from the primitive number board based on timers, fluency metrics, and the dynamically generated hints. As described below in conjunction with FIG. 9, the client device 120 can present the dynamic number board game with timers that change in color depending upon the time taken by the user to answer the problem, a set of fluency metrics that indicate features like accuracy, consistency, etc. of the user's performance, and one or more hints dynamically generated and displayed in the form of a graphical object (e.g. a light bulb). In alternate embodiments, the server 140 can present to the client device 120 a dynamic number board game generated from the primitive number board based on timers, fluency metrics, and the dynamically generated hints.

Dynamic Number Board Game

As described below, FIGS. 4-10 illustrate the different steps involved right from when a user of the client device 120 is logging in to the virtual number board game, and finishes playing the game to receive a summary of his/her achievements within the game.

Figure 4:
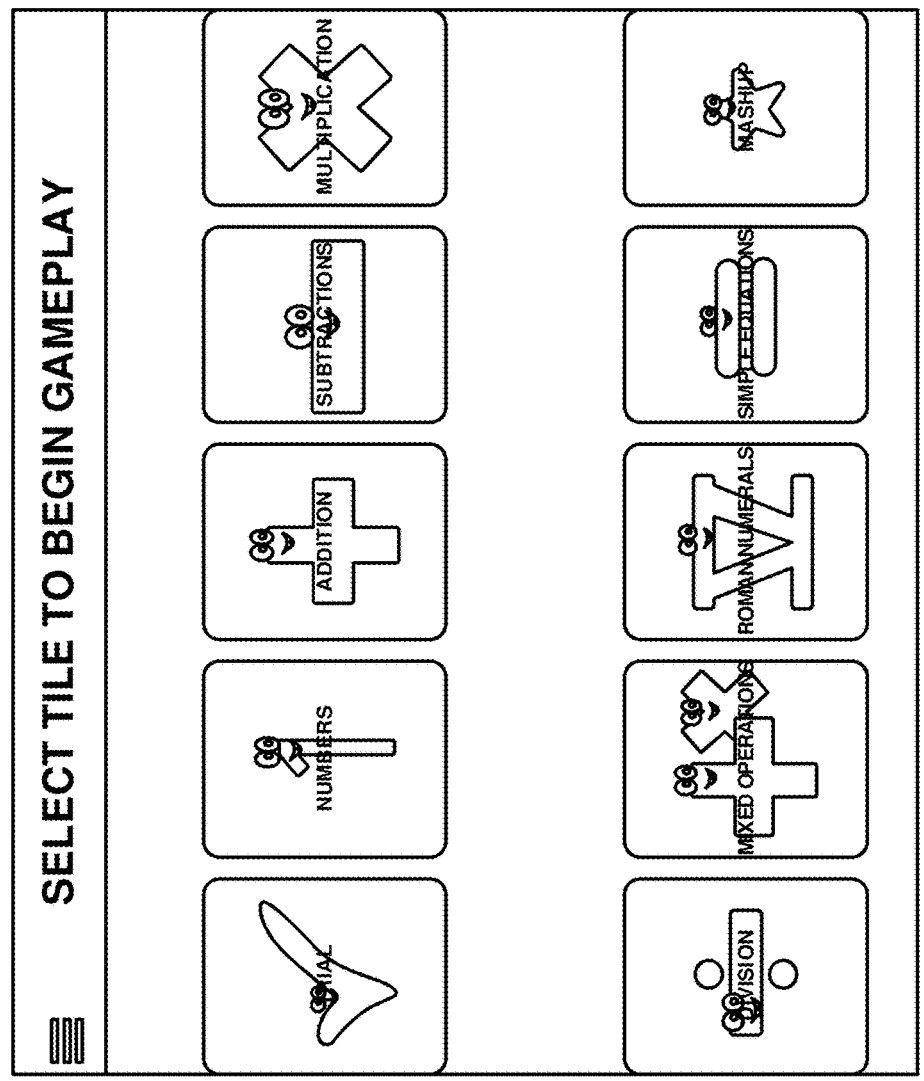
FIG. 4 is an illustrative example of a user interface of the client device of FIG. 2 with a dynamically generated virtual number board game, according to some embodiments of the present disclosure.

FIG. 4 is an illustrative example of a user interface 400 of the client device of FIG. 2 with a dynamically generated virtual number board game, according to some embodiments of the present disclosure. The user interface 400 can a display presented to a user of the client device 120 after the user logging into the virtual number board game. The user interface 400 shows an example with ten tiles—Trial, Numbers, Addition, Subtraction, Multiplication, Division, Mixed Operations, Ratios and Proportions, Roman Numerals, Simple Equations and Mash Ups. The user of the client device 120 of FIG. 1 can select one of the tiles through the user interface 400. In some configurations, when the user is logged in, a portion of the tiles may be available for playing and a portion of the tiles may be unavailable or locked for access.

In one example, the user can input the mathematical concept of the virtual number board game by directly pressing a portion of the user interface 400 corresponding to a tile (e.g. addition). Each tile can be further segmented into multiple skills that the user of the virtual number board game may want to be trained in. For example, the Addition tile can contain eleven skills including Beginner Addition (with no carry over), Advanced Addition (with carry over), Add by 1, Add by 2, Add by 3, through Add by 9, etc.

Figure 5:
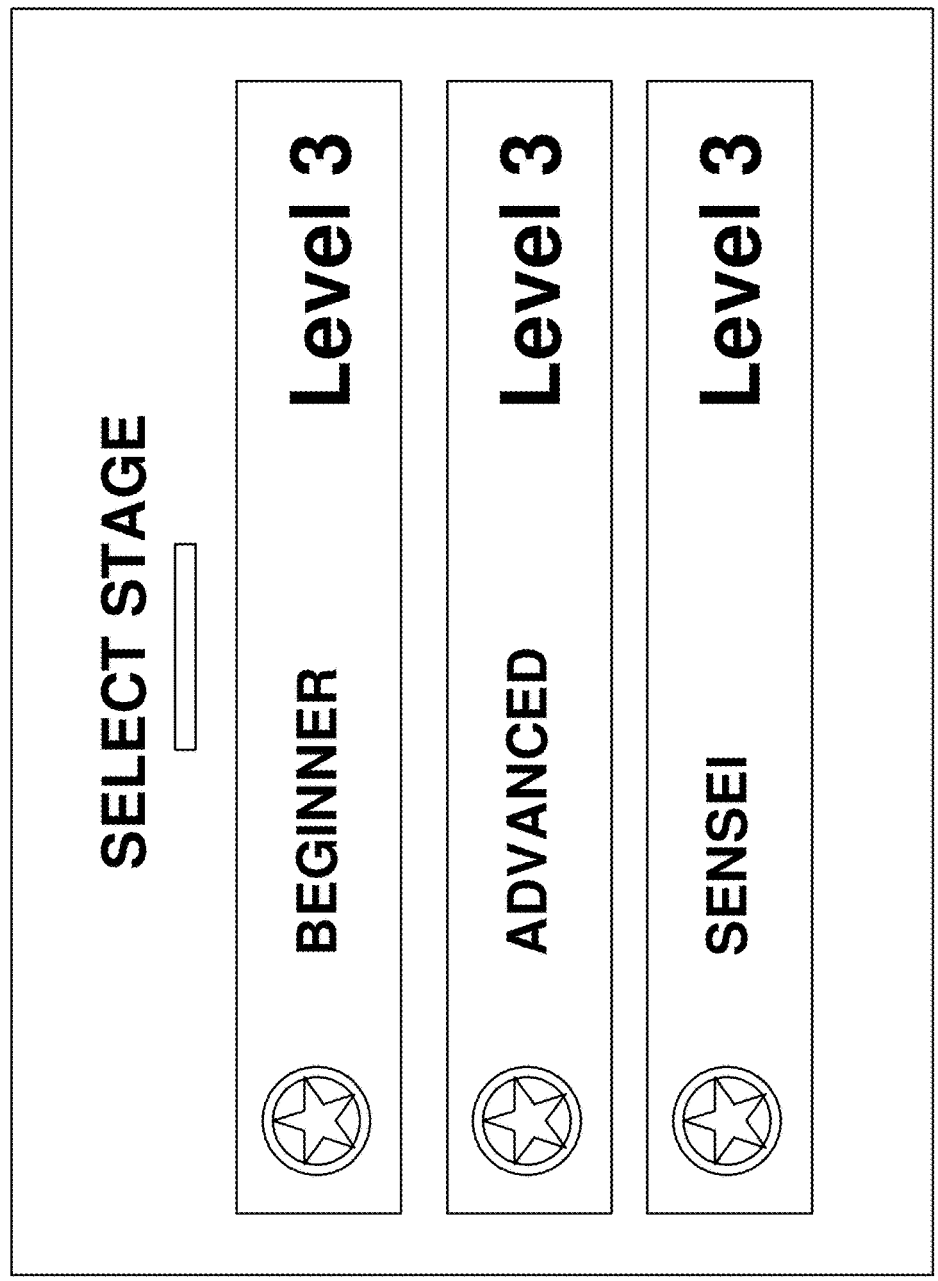
FIG. 5 is an illustrative example of a user interface of the client device of FIG. 2 with a dynamically generated virtual number board game, according to some embodiments of the present disclosure.

FIG. 5 is an illustrative example of a user interface 500 of the client device of FIG. 2 with a dynamically generated virtual number board game, according to some embodiments of the present disclosure. The user interface 500 is a screenshot of the dynamically generated virtual number board game that allows the user to choose a track or stage to play and receive a choice of stages that the user can play. In the example of FIG. 5, the user can choose at least one of three stages—Beginner, Advanced and Sensei. The Beginner stage can be the easiest stage and can have only a basic layout. The Advanced stage can be a little harder and can include a zig zag layout along with the basic layout. The Sensei stage can prove real mastery with the hardest difficulty and can include three layouts—spiral, zigzag, and basic. As the user goes from the Beginner to Advanced to Sensei tracks, the complexity levels of the problems increase, the mastery requirements for each level increase, and the users of the virtual number board game can be presented with increasing difficulty levels. In one example, each stage can have 20 levels. The user can start from Level 1 and master each level to finally reach Level 20. As shown in FIG. 5, the user can see what level the user is currently on for each of the stages.

Figure 6:
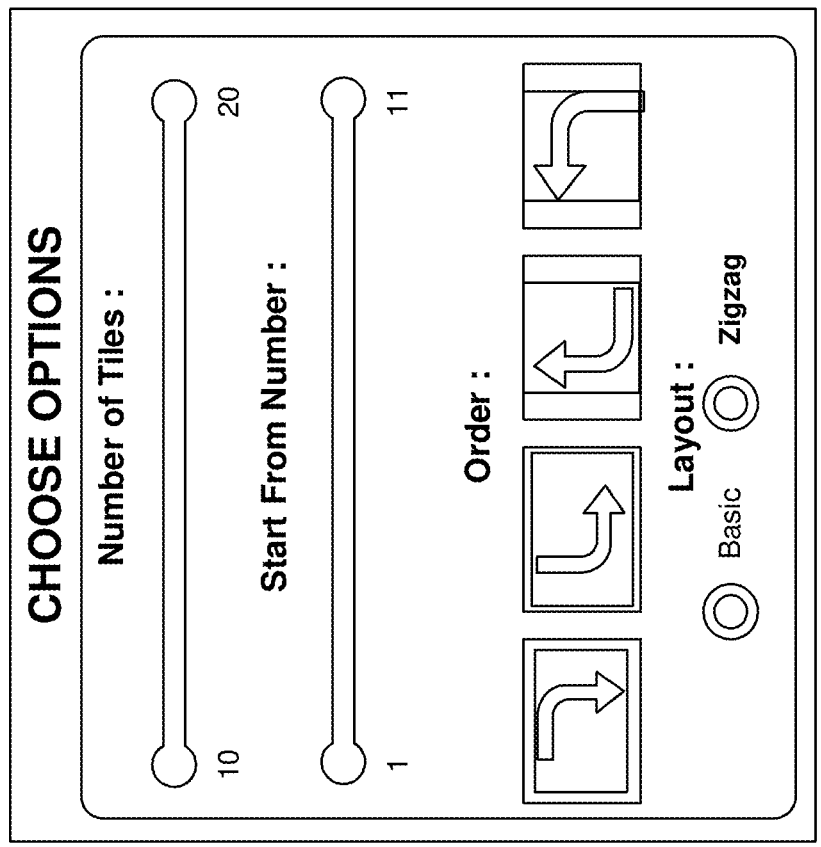
FIG. 6 is an illustrative example of a user interface of the client device of FIG. 2 with a dynamically generated virtual number board game, according to some embodiments of the present disclosure.

FIG. 6 is an illustrative example of a user interface 600 of the client device of FIG. 2 with a dynamically generated virtual number board game, according to some embodiments of the present disclosure. The user interface 600 is a screenshot of the dynamically generated virtual number board game that allows the user to choose options such as number of tiles (e.g. 10 to 20), a starting value for the number of tiles (e.g. 1 to 11), a type of order (e.g. right then down, bottom then right, etc.), a type of layout (e.g. zigzag), etc. The number of tiles can determine the number of tiles the user wants to have on the virtual number board game. The starting value can be the lowest number on the virtual number board game that the user can start from. The type of order can be based on a starting point for the numbers and the direction the numbers can increase on the virtual number board game. Each of the options can be an input data stored in the input data store 205, as described above in conjunction with FIG. 2. In some configurations, the user interface 600 can also include a goals section (not shown here) that can display a list of goals to pass the level or to get achievement badges.

Examples of Ordering of Number Tiles

Figure 7A:
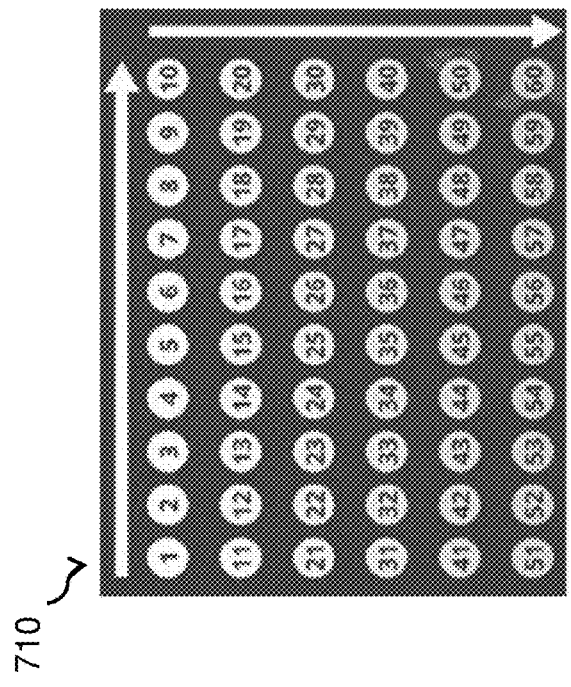
FIGS. 7A-D is an illustrative example of a user interface of the client device of FIG. 2 with a dynamically generated virtual number board game, according to some embodiments of the present disclosure.

FIG. 7A is an illustrative example of a user interface 710 of the client device of FIG. 2 with a dynamically generated virtual number board game, according to some embodiments of the present disclosure. The user interface 710 can be a screenshot of the dynamically generated virtual number board game when the type of ordering of tiles is 'Right then Down.' In the example of FIG. 7A, the numbers start at the top-left (i.e. number '1') and then increase as we go right, through the first row (i.e. until number '10'). The numbers keep increasing as we move down the rows of the dynamic number board game (i.e. from number '10' to '60'). Note that the dynamic number board game provides a visual cue to the user by dynamically varying the brightness of respective rows and columns of numbers in accordance with the type of ordering.

Figure 7B:
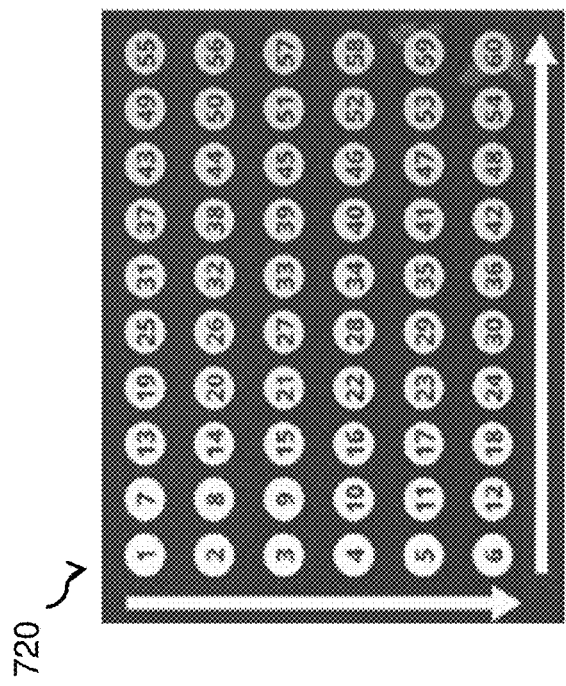

FIG. 7B is an illustrative example of a user interface 720 of the client device of FIG. 2 with a dynamically generated virtual number board game, according to some embodiments of the present disclosure. The user interface 720 can be a screenshot of the dynamically generated virtual number board game when the type of ordering of tiles is 'Down then Right.' In the example of FIG. 7B, the numbers start at the top-left (i.e. number '1') and then increase as we go down, through the first column (i.e. until number '6'). The numbers keep increasing as we move down the columns of the dynamic number board game (i.e. from number '1' to '6'). Note that the dynamic number board game provides a visual cue to the user by dynamically varying the brightness of respective rows and columns of numbers in accordance with the type of ordering.

Figure 7C:
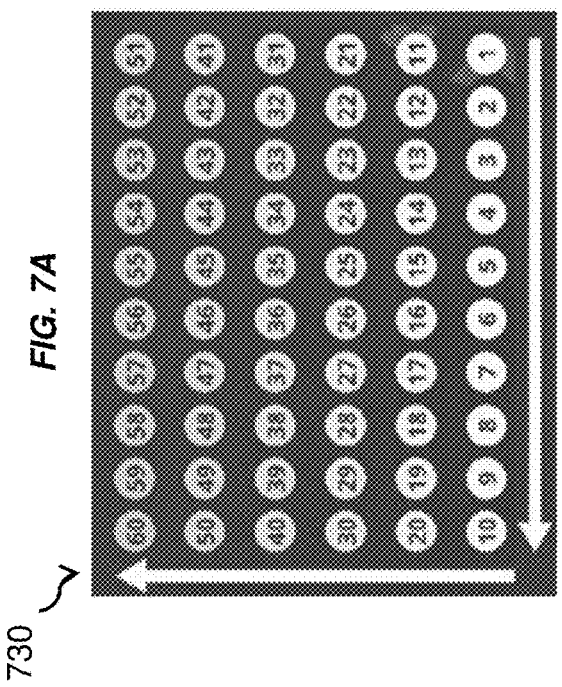

FIG. 7C is an illustrative example of a user interface 730 of the client device of FIG. 2 with a dynamically generated virtual number board game, according to some embodiments of the present disclosure. The user interface 730 can be a screenshot of the dynamically generated virtual number board game when the type of ordering of tiles is 'Left then Up.' In the example of FIG. 7C, the numbers start at the bottom-right (i.e. number '1') and then increase as we go left, through the last row (i.e. until number '10'). The numbers keep increasing as we move along the rows of the dynamic number board game (i.e. from number '1' to '10'). Note that the dynamic number board game provides a visual cue to the user by dynamically varying the brightness of respective rows and columns of numbers in accordance with the type of ordering.

Figure 7D:
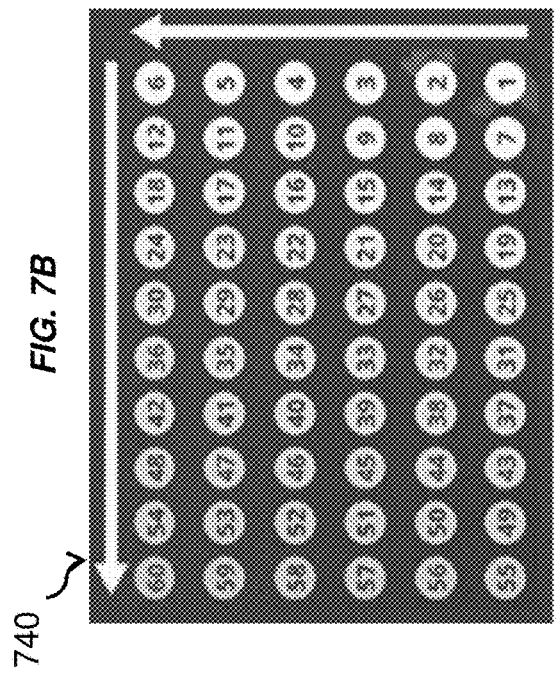

FIG. 7D is an illustrative example of a user interface 740 of the client device of FIG. 2 with a dynamically generated virtual number board game, according to some embodiments of the present disclosure. The user interface 740 can be a screenshot of the dynamically generated virtual number board game when the type of ordering of tiles is 'Up then Left.' In the example of FIG. 7D, the numbers start at the bottom-right (i.e. number '1') and then increase as we go up, through the last column (i.e. until number '6'). The numbers keep increasing as we move up the columns of the dynamic number board game (i.e. from number '1' to '6'). Note that the dynamic number board game provides a visual cue to the user by dynamically varying the brightness of respective rows and columns of numbers in accordance with the type of ordering. In addition to the four different orderings described above, there could be other types (e.g. Right then Up, Up then Right, Left then Down and Down then Left) of ordering that can be implemented as part of the dynamic number board.

Examples of Layouts of Number Tiles

FIG. 8A is an illustrative example of a user interface 810 of the client device of FIG. 2 with a dynamically generated virtual number board game, according to some embodiments of the present disclosure. The user interface 810 can be a screenshot of the dynamically generated virtual number board game when the type of layout of tiles is 'Basic.' In the example of FIG. 8A, the numbers start at the top-left (i.e. number '1') and then increase as we go right, through the first row (i.e. until number '10'). The numbers keep increasing in the same direction (i.e. left to right) as we move along the respective rows of the dynamic number board game (i.e. from number '11' to '20', from number '21' to '30', etc.). Note that the dynamic number board game provides a visual cue to the user by dynamically varying the brightness of respective rows of numbers in accordance with the type of layout.

FIG. 8B is an illustrative example of a user interface 820 of the client device of FIG. 2 with a dynamically generated virtual number board game, according to some embodiments of the present disclosure. The user interface 820 can be a screenshot of the dynamically generated virtual number board game when the type of layout of tiles is 'Zigzag.' In the example of FIG. 8A, the numbers start at the top-left (i.e. number '1') and then increase as we go right, through the first row (i.e. until number '10'). The numbers keep increasing in the same direction (i.e. left to right) as we move along a first row of the dynamic number board game and then the numbers keep increasing in an opposite direction (i.e. from number '11' to '20') as we move along a second row adjacent to the first row. Note that the dynamic number board game provides a visual cue to the user by dynamically varying the brightness of adjacent rows of numbers in accordance with the type of layout.

FIG. 8C is an illustrative example of a user interface 830 of the client device of FIG. 2 with a dynamically generated virtual number board game, according to some embodiments of the present disclosure. The user interface 830 can be a screenshot of the dynamically generated virtual number board game when the type of layout of tiles is 'Spiral.' In the example of FIG. 8C, the numbers start at the top-left (i.e. number '1') and then increase as we go right, through the first row (i.e. until number '10'). Next, the numbers keep increasing as we move down through the last column (i.e. from number '10' to number '15'). Next, the numbers keep increasing in an opposite direction (i.e. right to left) as we move along the last row (i.e. from number '15' to number '24') of the dynamic number board game. Then, the numbers keep increasing (i.e. from number '24' to '28') as we move along the first column. Note that the dynamic number board game provides a visual cue to the user by dynamically varying the brightness of adjacent rows and columns of numbers in accordance with the type of layout.

Example of a Dynamic Virtual Number Board Game

Figure 9:
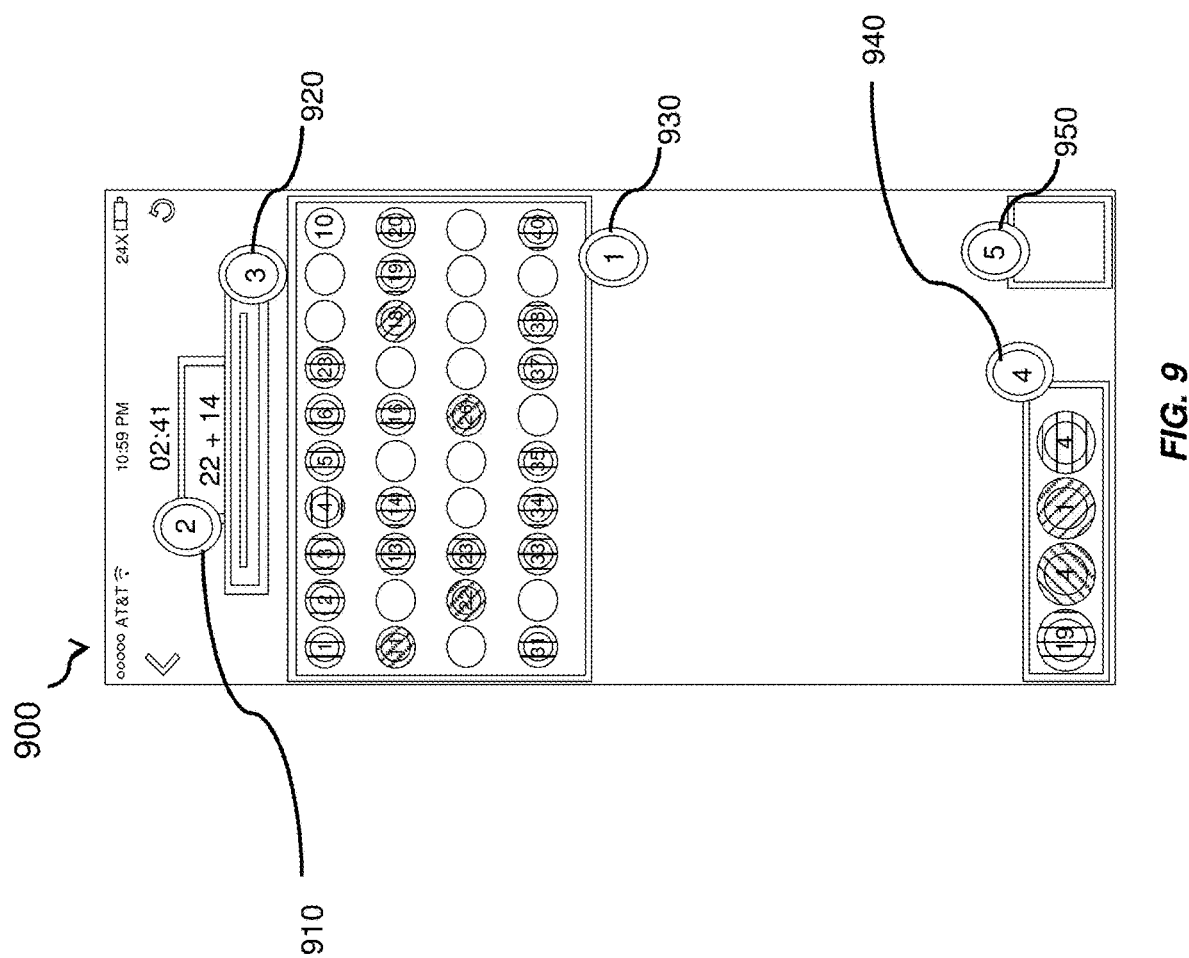
FIG. 9 is an illustrative example of a user interface of the client device of FIG. 2 with a dynamically generated virtual number board game, according to some embodiments of the present disclosure.

FIG. 9 is an illustrative example of a user interface 900 of the client device of FIG. 2 with a dynamically generated virtual number board game, according to some embodiments of the present disclosure. The user interface 900 is a screenshot of the dynamic number board game with a generated problem 910, a dynamic timer 920, an answer tile 930, one or more scores 940, and one or more dynamic hints 950. As shown in FIG. 9, the dynamic number board game can be created based on the options selected by the user using the user interfaces described above in conjunction with FIGS. 4-6. The user interface 900 has circular tiles representing positive whole numbers. For example, if the user chose starting number 21 and chose to have 40 tiles, the user interface 900 will show numbers 21-60 arranged based on the ordering and layout that the user chose. Based on your stage selected by the user, the user interface 900 can have a problem that matches one of the numbers on the dynamic number board game. When a problem comes up, the user can solve it, and then click the matching number tile from the answer tile 930. The dynamic timer 920 can show how much time is left to answer the problem displayed in the user interface 900. A color of the dynamic timer 920 can change from, for example, green to yellow to orange—indicating that the user is running out of time to answer the generated problem. The scores 940 can indicate how many colored (e.g. green, yellow, orange and red) tiles the user has received so far in the current game. The user can click on the dynamic hints 950 button to receive a hint for the answer generated by the hint engine 220 of FIG. 2. In some configurations, a number displayed on a graphical object (e.g. a light bulb) within the dynamic hints 950 button can indicate the remaining number of hints to answer the generated problem.

Figure 10:
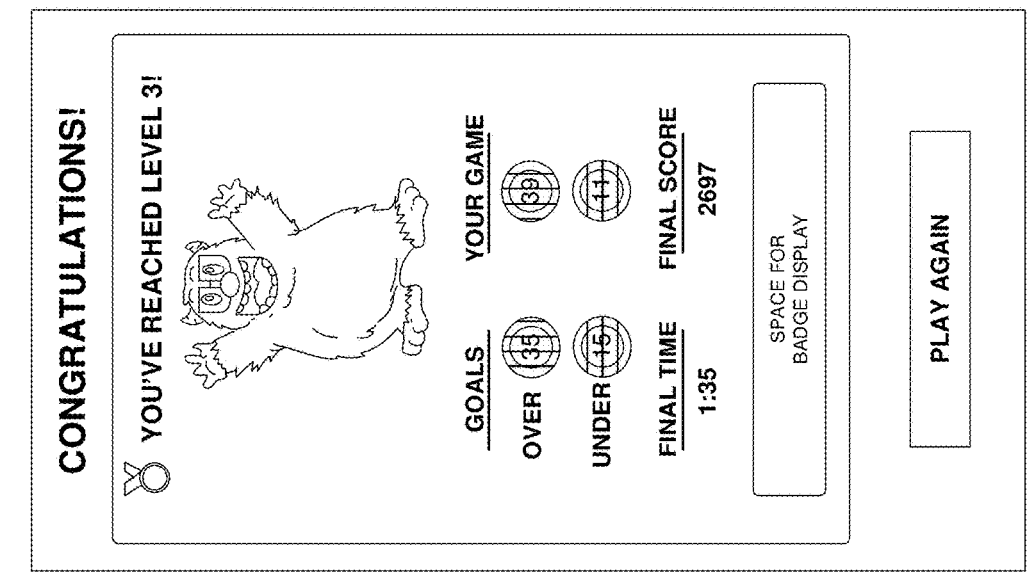
FIG. 10 is an illustrative example of a user interface of the client device of FIG. 2 with a dynamically generated virtual number board game, according to some embodiments of the present disclosure.

FIG. 10 is an illustrative example of a user interface 1000 of the client device of FIG. 2 with a dynamically generated virtual number board game, according to some embodiments of the present disclosure. The user interface 1000 can be a screenshot of the dynamic number board game that is displayed when a user finishes playing the game on the client device 120. In the example of FIG. 10, the user interface 1000 can display the user's achievements such as a number of color coins that the user received, a final score, a summary of time of play of the game, a type of rewards (e.g. a virtual badge) earned by the user, etc.

Figure 11:
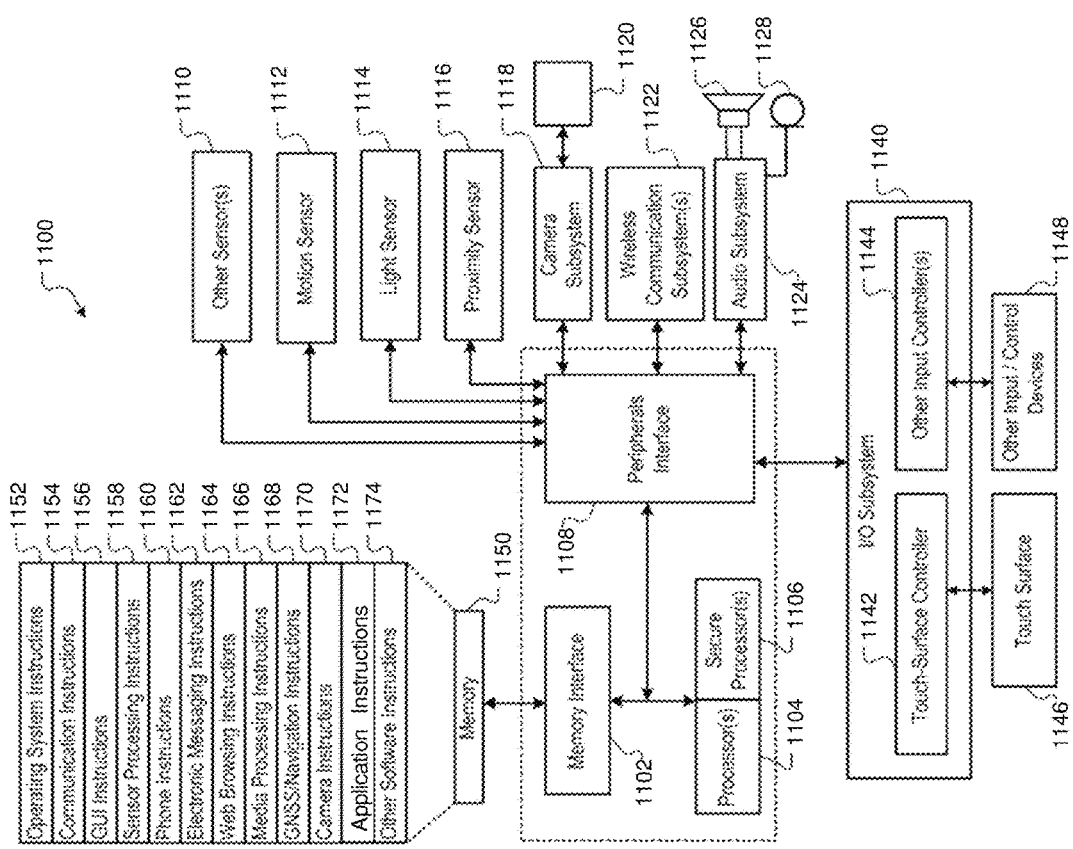
FIG. 11 is an illustrative client device for dynamically generating a virtual number board game, according to an embodiment of the present disclosure.

Example of Client Device for Generating and Displaying a Dynamic Virtual Game Board FIG. 11 is an illustrative user device 1100 for generating and displaying a dynamic virtual game board using the system of FIG. 1, according to an embodiment of the present disclosure. The illustrative user device 1100 may include a memory interface 1102, one or more data processors, image processors, central processing units 1104, and/or secure processing units 1105, and a peripherals interface 1106. The memory interface 1102, the one or more processors 1104 and/or secure processors 1105, and/or the peripherals interface 1106 may be separate components or may be integrated in one or more integrated circuits. The various components in the user device 1100 may be coupled by one or more communication buses or signal lines.

Sensors, devices, and subsystems may be coupled to the peripherals interface 1106 to facilitate multiple functionalities. For example, a motion sensor 1110, a light sensor 1112, and a proximity sensor 1114 may be coupled to the peripherals interface 1106 to facilitate orientation, lighting, and proximity functions. Other sensors 1116 may also be connected to the peripherals interface 1106, such as a global navigation satellite system (GNSS) (e.g., GPS receiver), a temperature sensor, a biometric sensor, magnetometer, or other sensing device, to facilitate related functionalities.

A camera subsystem 1120 and an optical sensor 1122, e.g., a charged coupled device (CCD) or a complementary metal-oxide semiconductor (CMOS) optical sensor, may be utilized to facilitate camera functions, such as recording photographs and video clips. The camera subsystem 1120 and the optical sensor 1122 may be used to collect images of a user to be used during authentication of a user, e.g., by performing facial recognition analysis.

Communication functions may be facilitated through one or more wired and/or wireless communication subsystems 1124, which can include radio frequency receivers and transmitters and/or optical (e.g., infrared) receivers and transmitters. For example, the Bluetooth (e.g., Bluetooth low energy (BTLE)) and/or WiFi communications described herein may be handled by wireless communication subsystems 1124. The specific design and implementation of the communication subsystems 1124 may depend on the communication network(s) over which the user device 1100 is intended to operate. For example, the user device 1100 may include communication subsystems 1124 designed to operate over a GSM network, a GPRS network, an EDGE network, a WiFi or WiMax network, and a Bluetooth™ network. For example, the wireless communication subsystems 1124 may include hosting protocols such that the device 1100 can be configured as a base station for other wireless devices and/or to provide a WiFi service.

An audio subsystem 1126 may be coupled to a speaker 1128 and a microphone 1130 to facilitate voice-enabled functions, such as speaker recognition, voice replication, digital recording, and telephony functions. The audio subsystem 1126 may be configured to facilitate processing voice commands, voice printing, and voice authentication, for example.

The I/O subsystem 1140 may include a touch-surface controller 1142 and/or other input controller(s) 1144. The touch-surface controller 1142 may be coupled to a touch surface 1146. The touch surface 1146 and touch-surface controller 1142 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1146.

The other input controller(s) 1144 may be coupled to other input/control devices 1148, such as one or more buttons, rocker switches, thumb-wheel, infrared port, USB port, and/or a pointer device such as a stylus. The one or more buttons (not shown) may include an up/down button for volume control of the speaker 1128 and/or the microphone 1130.

In some implementations, a pressing of the button for a first duration may disengage a lock of the touch surface 1146; and a pressing of the button for a second duration that is longer than the first duration may turn power to the user device 1100 on or off. Pressing the button for a third duration may activate a voice control, or voice command, module that enables the user to speak commands into the microphone 1130 to cause the device to execute the spoken command. The user may customize a functionality of one or more of the buttons. The touch surface 1146 can, for example, also be used to implement virtual or soft buttons and/or a keyboard.

In some implementations, the user device 1100 may present recorded audio and/or video files, such as MP3, AAC, and MPEG files. In some implementations, the user device 1100 may include the functionality of an MP3 player, such as an iPod™. The user device 1100 may, therefore, include a 36-pin connector and/or 8-pin connector that is compatible with the iPod. Other input/output and control devices may also be used.

The memory interface 1102 may be coupled to memory 1150. The memory 1150 may include high-speed random access memory and/or non-volatile memory, such as one or more magnetic disk storage devices, one or more optical storage devices, and/or flash memory (e.g., NAND, NOR). The memory 1150 may store an operating system 1152, such as Darwin, RTXC, LINUX, UNIX, OS X, WINDOWS, or an embedded operating system such as VxWorks.

The operating system 1152 may include instructions for handling basic system services and for performing hardware dependent tasks. In some implementations, the operating system 1152 may be a kernel (e.g., UNIX kernel). In some implementations, the operating system 1152 may include instructions for performing voice authentication.

The memory 1150 may also store communication instructions 1154 to facilitate communicating with one or more additional devices, one or more computers and/or one or more servers. The memory 1150 may include graphical user interface instructions 1156 to facilitate graphic user interface processing; sensor processing instructions 1158 to facilitate sensor-related processing and functions (e.g. sensory notification); phone instructions 1160 to facilitate phone-related processes and functions; electronic messaging instructions 1162 to facilitate electronic-messaging related processes and functions; web browsing instructions 1164 to facilitate web browsing-related processes and functions; media processing instructions 1166 to facilitate media processing-related processes and functions; GNSS/Navigation instructions 1168 to facilitate GNSS and navigation-related processes and instructions; and/or camera instructions 1170 to facilitate camera-related processes and functions.

The memory 1150 may store application instructions 1172 for a marketplace app, such as discussed above in conjunction with FIG. 1. For example, the memory 1150 may store instructions corresponding to the client application 205 shown in FIG. 2.

Each of the above identified instructions and applications may correspond to a set of instructions for performing one or more functions described herein. These instructions need not be implemented as separate software programs, procedures, or modules. The memory 1150 may include additional instructions or fewer instructions. Furthermore, various functions of the user device may be implemented in hardware and/or in software, including in one or more signal processing and/or application specific integrated circuits.

In some embodiments, processor 1104 may perform processing including executing instructions stored in memory 1150, and secure processor 1105 may perform some processing in a secure environment that may be inaccessible to other components of user device 1100. For example, secure processor 1105 may include cryptographic algorithms on board, hardware encryption, and physical tamper proofing. Secure processor 1105 may be manufactured in secure facilities. Secure processor 1105 may encrypt data/challenges from external devices. Secure processor 1105 may encrypt entire data packages that may be sent from user device 1100 to the network. Secure processor 1105 may separate a valid user/external device from a spoofed one, since a hacked or spoofed device may not have the private keys necessary to encrypt/decrypt, hash, or digitally sign data, as described herein.

CONCLUSION

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate. The program logic may be run on a physical or virtual processor. The program logic may be run across one or more physical or virtual processors.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

Additionally, the software included as part of the concepts, structures, and techniques sought to be protected herein may be embodied in a computer program product that includes a computer-readable storage medium. For example, such a computer-readable storage medium can include a computer-readable memory device, such as a hard drive device, a CD-ROM, a DVD-ROM, or a computer diskette, having computer-readable program code segments stored thereon. In contrast, a computer-readable transmission medium can include a communications link, either optical, wired, or wireless, having program code segments carried thereon as digital or analog signals. A non-transitory machine-readable medium may include but is not limited to a hard drive, compact disc, flash memory, non-volatile memory, volatile memory, magnetic diskette, and so forth but does not include a transitory signal per se. In describing exemplary embodiments, specific terminology is used for the sake of clarity. For purposes of description, each specific term is intended to at least include all technical and functional equivalents that operate in a similar manner to accomplish a similar purpose.

Additionally, in some instances where a particular exemplary embodiment includes a plurality of system elements, device components or method steps, those elements, components or steps may be replaced with a single element, component, or step. Likewise, a single element, component, or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

What is claimed is:

1. A method comprising:
receiving, by a client device, input data associated with generation of a dynamic number board game;
generating, by the client device, one or more timers in accordance with the received input data;
determining, by the client device, one or more fluency metrics in accordance with the received input data;
generating, by the client device, a primitive number board game based on the received input data;
generating, by the client device, one or more problems for the primitive number board game based on the received input data;
generating, by the client device, one or more hints for each of the generated one or more problems; and
presenting for display, by the client device, the dynamic number board game based on the primitive number board game, the one or more timers, the one or more fluency metrics, and the generated one or more hints, wherein the dynamic number board game comprises a plurality of numbers, wherein one or more users selects one or more numbers of the plurality of numbers to solve the generated one or more problems.

2. The method of claim 1, further comprising:
measuring one or more scores of the one or more users based on a level of interaction of each user with the dynamic number board game.

3. The method of claim 1, further comprising:
performing, by the client device, an evaluation of one or more levels of interaction of each user of the dynamic number board game;
generating, by the client device, a report comprising the evaluated performance of each user; and
presenting for display, through a user interface of the client device, the generated report.

4. The method of claim 1, wherein the one or more hints are generated based on a type of the problem, a user history, and one or more principles of math learning.

5. The method of claim 1, wherein the received input data comprises at least one of: a number sense concept, a type of skill, a total number of tiles in the dynamic number board game, a starting value of a first tile in the dynamic number board game, a type of ordering of tiles in the dynamic number board game, a type of layout of tiles in the dynamic number board game, one or more display settings in the dynamic number board game, and one or more user historical information.

6. The method of claim 1, wherein generating the one or more hints for each of the generated one or more problems further comprises:
identifying one or more patterns in user interaction with each of the generated one or more problems; and
performing a decomposition of each of the generated one or more problems into a plurality of solvable elements, wherein the client device modifies each of the plurality of solvable elements to achieve a final answer for each of the generated one or more problems.

7. The method of claim 1, wherein generating the one or more timers in accordance with the received input data is based on one or more machine learning models.

8. The method of claim 1, wherein a user of the client device provides the input data based on an interaction of the user with a display of the dynamic number board game.

9. The method of claim 1, wherein the client device determines the one or more input data associated with generation of the dynamic number board game by:
determining a threshold value of complexity of the genereated one or more problems presented to a player of the dynamic number board game; and
determining a readiness of the player to be presented with the threshold value of complexity of the generated one or more problems based on the one or more determined fluency metrics.

10. The method of claim 1, wherein presenting for display the dynamic number board game further comprises:
presenting for display, each of a plurality of positive whole numbers responsive to a user of the client device interacting with a practice mode button of the dynamic number board game; and
presenting for display, a portion of the plurality of positive whole numbers responsive to the user of the client device interacting with a play mode button of the dynamic number board game.

11. A method for generation of a dynamic number board game, the method comprising:
retrieving, by a server, input data associated with generation of a dynamic number board game;
generating, by the server, one or more timers in accordance with the input data;
determining, by the server, one or more fluency metrics in accordance with the retrieved input data;
generating, by the server, one or more problems based on the retrieved input data;
generating, by the server, one or more dynamic hints for each of the generated one or more problems; and
presenting for display, by the server, the dynamic number board game generated based on the one or more timers, the one or more fluency metrics, and the generated one or more hints, wherein the dynamic number board game comprises a plurality of numbers, wherein one or more users selects one or more numbers of the plurality of numbers to solve the generated one or more problems.

12. The method of claim 11, further comprising:
measuring, by the server, one or more scores received one or more client devices based on a level of interaction of each user of the one or more client devices with the dynamic number board game.

13. The method of claim 11, further comprising:
performing, by the server, an evaluation of one or more levels of interaction of each user of one or more client devices with the dynamic number board game;
generating, by the server, a report comprising the evaluated performance of each user; and presenting for display, through a user interface of at least one of the client devices, the generated report.

14. The method of claim 11, wherein one or more hints are generated based on a type of the problem, a user history, and one or more principles of math learning.

15. The method of claim 11, wherein the one or more input data comprises at least one of: a number of tiles in the dynamic number board game, a starting value of a tile in the dynamic number board game, a type of ordering of tiles in the dynamic number board game, a type of layout of tiles in the dynamic number board game, and one or more display settings in the dynamic number board game.

16. The method of claim 11, wherein generating the one or more dynamic hints for each of the generated one or more problems further comprises:
identifying one or more patterns in user interaction with each of the generated one or more problems; and
performing a decomposition of each of the generated one or more problems into a plurality of solvable elements, wherein a client device modifies each of the plurality of solvable elements to achieve a final answer for the generated one or more problems.

17. The method of claim 11, wherein generating the one or more timers in accordance with the retrieved input data based on one or more machine learning models.

18. The method of claim 11, wherein the server retrieves the one or more input data associated with generation of the dynamic number board game by:
determining a threshold value of complexity of the generated one or more problems presented to a player of the dynamic number board game; and
determining a readiness of the player to be presented with the threshold value of complexity of generated one or more problems based on the one or more determined fluency metrics.

19. The method of claim 11, wherein presenting for display the dynamic number board game further comprises:
presenting for display, a plurality of positive whole numbers responsive to a user of a client device interacting with a practice mode button of the dynamic number board game; and
presenting for display, a portion of the plurality of positive whole numbers responsive to the user of the client device interacting with a play mode button of the dynamic number board game.

20. An apparatus for electronically generating a number board game comprising:
    an input data store configured for:
        storing input data received from a user of the apparatus;
    a board generator configured for:
        generating a primitive number board game based on the input data; and
        presenting for display a dynamic number board game generated from the primitive number board game, wherein the dynamic number board game comprises a plurality of numbers, wherein one or more users selects one or more numbers of the plurality of numbers to solve one or more problems;
    a problem engine configured for:
        generating the one or more problems for the primitive number board game based on the one or more input data;
    a hint engine configured for:
    generating one or more hints for each of the generated one or more problems by:
        identifying one or more patterns in user interaction with each of the generated one or more problems; and
        performing a decomposition of the generated one or more problems into a plurality of solvable elements, wherein the hint engine modifies each of the plurality of solvable elements to achieve a final answer for each of the generated one or more problems;
    a dynamic timer configured for:
    generating one or more timers in accordance with the received input data;
    a dynamic scorer configured for:
    measuring one or more scores of one or more users of the apparatus based on a level of interaction of each user with the dynamic number board game;
    a fluency evaluator configured for:
    determining one or more fluency metrics in accordance with the received input data; and
    an adaptive engine configured for:
    determining a threshold value of complexity of the generated one or more problems presented to a player of the dynamic number board game; and
    determining a readiness of the player to be presented with the threshold value of complexity of the generated one or more problems based on the one or more fluency metrics determined by the fluency evaluator.

\* \* \* \* \*